United States Patent
Roper, Jr.

(10) Patent No.: US 7,534,413 B2
(45) Date of Patent: May 19, 2009

(54) CALCIUM-SODIUM POLYSULFIDE CHEMICAL REAGENT AND PRODUCTION METHODS

(75) Inventor: Ralph E. Roper, Jr., Carmel, IN (US)

(73) Assignee: Heritage Environment Services, LLC, Indianapolis, IN (US)

( * ) Notice: Subject to any disclaimer, the term of this patent is extended or adjusted under 35 U.S.C. 154(b) by 238 days.

(21) Appl. No.: 11/106,330

(22) Filed: Apr. 14, 2005

(65) Prior Publication Data

US 2006/0094920 A1    May 4, 2006

Related U.S. Application Data

(63) Continuation-in-part of application No. 10/977,826, filed on Oct. 29, 2004, now Pat. No. 7,144,362.

(51) Int. Cl.
    *C01B 17/42* (2006.01)
(52) U.S. Cl. .................................. 423/562
(58) Field of Classification Search .......... 423/562
    See application file for complete search history.

(56) References Cited

U.S. PATENT DOCUMENTS

| | | | |
|---|---|---|---|
| 1,434,266 A | 10/1922 | Taki | |
| 1,517,522 A | 12/1924 | Volck | |
| 2,135,879 A | 11/1938 | Shiffler et al. | |
| 3,216,887 A | 11/1965 | Landmark | |
| 3,773,662 A * | 11/1973 | Urban | 210/719 |
| 4,024,229 A | 5/1977 | Smith et al. | |
| 4,624,419 A | 11/1986 | Hevesi et al. | |
| 4,722,832 A * | 2/1988 | Weston et al. | 423/578.2 |
| 5,234,546 A | 8/1993 | Chamblee | |
| 6,214,304 B1 | 4/2001 | Rosenthal et al. | |
| 6,264,819 B1 | 7/2001 | Andoh et al. | |
| 6,841,294 B1 | 1/2005 | Morrissey et al. | |

OTHER PUBLICATIONS

Hackh's Chemical Dictionary (Fourth Edition), 1969, McGraw-Hill Book Company, p. 574 (no month).*

"Calcium Polysulfide Remediation of Hexavalent Chromium Contamination from Chromite Ore Processing Residue," M.C. Grahm et al., Science of the Total Environment, available on line (www.sciencedirect.com) Jan. 26. 2006.

* cited by examiner

*Primary Examiner*—Wayne Langel
(74) *Attorney, Agent, or Firm*—Butzel Long

(57) ABSTRACT

A calcium-sodium polysulfide chemical reagent and methods for producing the reagent. The reagent is a blend of calcium polysulfide and sodium polysulfide that can be prepared using various types, sources and ratios of lime, elemental sulfur and sulfide ion using either virgin or waste materials. The reagent is amenable to inexpensive and high rate production methods at ambient or warmer temperatures. The reagent can be used to precipitate metals from wastewater, stabilize hexavalent chrome in hazardous waste residues, remove mercury from coal fired power plants, and as an electrolyte in large-scale bromide/polysulfide electrical storage batteries.

14 Claims, 2 Drawing Sheets

CALCIUM-SODIUM POLYSULFIDE CHEMICAL REAGENT AND PRODUCTION METHODS

RELATED APPLICATIONS

This application is a Continuation-In-Part of U.S. patent application Ser. No. 10/977,826, filed Oct. 29, 2004, now U.S. Pat. No. 7,144,362 the entire specification of which is hereby expressly incorporated by reference.

TECHNICAL FIELD

The present invention relates to polysulfide reagents that are particularly useful for precipitating metals from wastewater, stabilization of multivalent metals such as chrome in hazardous waste residues, mercury removal from flue gases, and as an electrolyte in large-scale bromide/polysulfide electrical storage batteries. The present invention is further directed to methods to produce the polysulfide reagents.

BACKGROUND ART

It has become increasingly apparent over the past few years that several new technologies are emerging that will require large quantities of inexpensive alkaline polysulfide chemical reagents. One such technology has focused on the stabilization of the massive amounts of chromite ore processing residues (COPR) that have accumulated at various sites throughout the United States over the last several decades due to the absence of a cost-effective treatment methodology.

According to one application of alkaline polysulfide chemical reagents which is disclosed in U.S. Pat. No. 6,214,304 to Rosenthal, it has been found that injecting alkaline polysulfides into the flue gas of coal-fired power plants can be highly effective for enhanced removal of mercury.

Another important area of emerging technologies involves regenerative fuel cells such as described in U.S. Pat. No. 6,841,294 to Morrissey. This area of technology, which is receiving ever increasing attention, requires large amounts of polysulfide reagents that are used as electrolytes in storage batteries.

Calcium polysulfide and sodium polysulfide are generally designated as $CaS_x$ and $Na_2S_2S_x$, respectively, where x indicates the number of sulfur atoms. Although many different methods for making calcium polysulfide or sodium polysulfide reagents have been previously developed over a period of many years, such methods are typically directed to making one type of polysufide or the other, but not both or multiple types simultaneously.

U.S. Pat. No. 1,434,266 to Taki is directed to a method for the manufacture of lime sulphur in which a mixture of calcium oxide (quick lime), elemental sulfur and water is steam heated above the melting point of sulfur in a pressurized revolving reactor to make a "lime sulfur" solution containing calcium polysulfide.

A similar method using a different type of reactor is disclosed in U.S. Pat. No. 4,624,419 to Hevesi et al. which is directed to an apparatus for preparing aqueous and oily sulfur containing products.

The chemical reaction for such methods is essentially:

$$3Ca(OH)_2 + (2x+2)S° + heat \rightarrow 3H_2O + CaS_2O_3 + 2CaS_x \qquad (1)$$

Similar reactions can be written in which the hydrated lime, $Ca(OH)_2$, is replaced with quick lime, $CaO$; and the calcium thiosulfate, $CaS_2O_3$, is replaced by calcium sulfite, $CaSO_3$.

Work by others lead to the accepted conclusion that methods based on the above reaction are undesirable because: (1) they require high temperatures (near boiling) to enable part of the elemental sulfur to be reduced to the sulfide ion needed for forming polysulfide; (2) the equivalent amount of elemental sulfur that is oxidized to thiosulfate ion (or alternatively to sulfite ion) to complete the oxidation-reduction reaction causes the polysulfide yield to be low; (3) the resulting product liquor is not a mixture of polysulfides alone; and (4) the thiosulfates and sulfites generate a great deal of sludge solids that limit the concentration at which the product can be produced.

U.S. Pat. No. 1,517,522 to Volck discloses a process for producing lime sulphur compounds. Volck teaches that a preferable method for making calcium polysulfide involves adding hydrogen sulfide to the lime-sulfur reaction to eliminate the consumption of elemental sulfur needed for internal generation of the sulfide. The reaction for calcium pentasulfide occurs as follows:

$$Ca(OH)_2 + H_2S + 4S° \rightarrow CaS_5 + 2H_2O \qquad (2)$$

Volck points out that the advantages of the above reaction include: (1) only polysulfide is produced; (2) the reaction proceeds quickly at ambient or warmer temperatures; (3) less sludge solids are produced; and (4) higher concentrations of polysulfide can be achieved. A related method for making calcium polysulfide using lime and hydrogen sulfide was subsequently developed and disclosed in U.S. Pat. No. 2,135,879 to Shiffler et al.

Many of the methods for making sodium polysulfide were developed specifically for applications in the pulp and paper industry where alkaline polysulfide cooking liquors are used to digest wood. U.S. Pat. No. 3,216,887 to Landmark and U.S. Pat. No. 4,024,229 to Smith et al. disclose oxygenation of sodium sulfide to form sodium polysulfide and sodium thiosulfate. U.S. Pat. No. 5,234,546 to Chamblee discloses a variety of techniques for recovering sodium polysulfide from various cooking liquors using techniques such as fuel cells and activated carbon catalyzed oxidation reactions. U.S. Pat. No. 6,264,819 to Andoh et al. discloses an electrolytic oxidation method for producing a sodium polysulfide cooking liquor which involves electrolytically oxidizing pulping liquors. Such applications are generally limited to relative dilute solutions of sodium polysulfide, e.g., typically in the range of 0.5% to 8.0%. Moreover they generally produce, or are susceptible to producing, thiosulfate along with the polysulfide.

DISCLOSURE OF THE INVENTION

According to various features, characteristics and embodiments of the present invention which will become apparent as the description thereof proceeds, the present invention provides a calcium-sodium polysulfide chemical reagent containing calcium polysulfide and sodium polysulfide in molar ratios ranging from about 9:1 to 1:9 and, according to one embodiment in a molar ratio of about 1:1.

The calcium-sodium polysulfide chemical reagent is a reaction product produced by reacting a source of alkalinity, a source of elemental sulfur, and a source of sulfide ions together. The source of alkalinity comprises at least one of hydrated lime, quick lime, sodium hydroxide and potassium hydroxide. The source of elemental sulfur comprises at least one of virgin sulfur or waste sulfur. The source of sulfide ions comprises at least one of sodium hydrosulfide, sodium sulfide, calcium hydrosulfide and hydrogen sulfide.

The present invention further provides a component polysulfide reagent containing calcium polysulfide and sodium polysulfide and at least one of potassium polysulfide and aluminum polysulfide wherein at least two of the polysulfides each comprise at least 10 wt. % of the total polysulfide content.

The present invention also provides a method for making a polysulfide reagent which involves:

providing a source of alkalinity;
providing a source of elemental sulfur;
providing a source of sulfide ions;
providing a reactor vessel; and
reacting the source of alkalinity, the source of elemental sulfur and the source of sulfide ions together in the reactor vessel.

According to one embodiment the source of alkalinity and the source of elemental sulfur are premixed together before being combined with the source of sulfide ions. Moreover, the source of alkalinity and the source of elemental sulfur can be premixed before being placed into the reactor vessel. The reaction can be carried out at room temperature or at a temperature above room temperature.

The present invention also provides a method of stabilizing oxyanions of chrome which involves:

providing a waste material that includes an oxyanion of chrome;
providing a polysulfide reagent containing calcium polysulfide and sodium polysulfide; and
applying the polysulfide reagent to the waste material to stabilize the oxyanion of chrome against excessive leaching.

According to one embodiment the waste material to be treated or stabilized comprises chromite ore processing residue.

BRIEF DESCRIPTION OF DRAWINGS

The present invention will be described with reference to the attached drawings which are given as non-limiting examples only, in which.

BEST MODE FOR CARRYING OUT THE INVENTION

Figure 1:
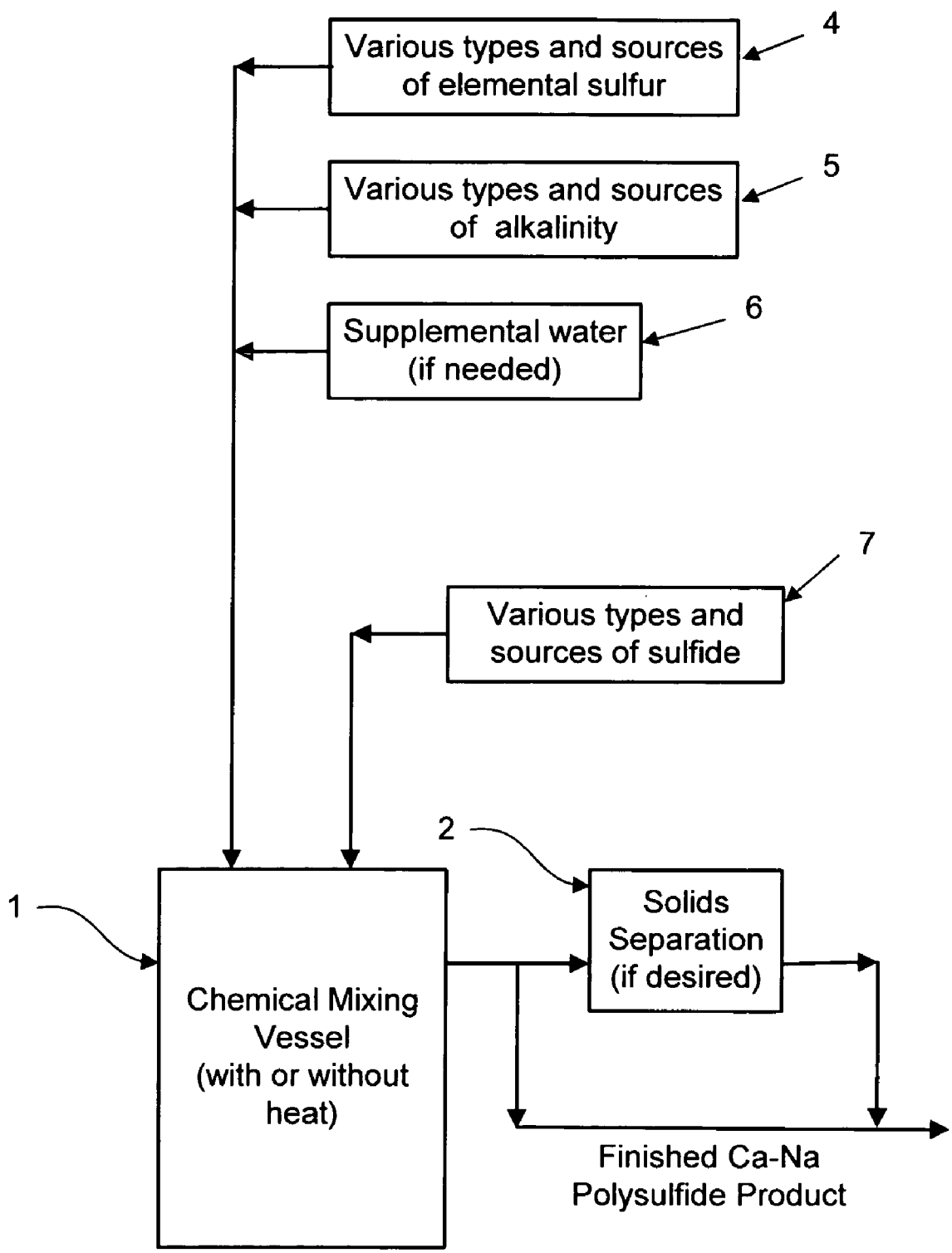
FIG. 1 is a flowchart depicting one manner of combining reagents to make a calcium-sodium polysulfide reagent according to one embodiment of the present invention.

The present invention is directed to polysulfide chemical reagents, methods for producing the reagents and methods of using the reagents. The polysulfide chemical reagents of the present invention are blends of sulfides that can be prepared from a variety of reactant sources. For example, the polysulfide chemical reagents of the present invention can be a blend of calcium polysulfide and sodium polysulfide that is prepared using various types, sources and ratios of lime, elemental sulfur and sulfide ion using either virgin or waste materials. The polysulfide reagents of the present invention are amenable to inexpensive and high rate production methods at ambient or warmer temperatures. Reference herein to "virgin sulfur" or "virgin reagents" or "virgin reactants" is intended to contrast between sulfur, reagents, and reactants that are derived from the direct or indirect use of waste sources and waste materials that include the sulfur, reagents, and reactants, i.e. "waste sources" (including "waste sulfur"). In practice, the use of waste sources and waste materials that contain or include the sulfur, reagents and reactants can reduce costs and provide a way of recovering some value from the waste sources and waste materials. However, it is to be understood that, as opposed to waste sources and waste materials, the sulfur, reagents and reactants can comprise any commercially available sources of these materials which is referred to herein as "virgin" sources.

The polysulfide reagent can be used to precipitate metals from wastewater, stabilize multivalent metals such as chrome in hazardous waste residues, remove mercury from flue gases, and as an electrolyte in large-scale bromide/polysulfide electrical storage batteries.

As disclosed in co-pending U.S. patent application Ser. No. 10/977,826, (to which priority of the present invention is claimed under 35 U.S.C. §120 and of which the entire specification is hereby expressly incorporated by reference), calcium polysulfide or other polysulfide bearing materials can be added to the process developed to stabilize selenium for the specific purpose of assisting in stabilizing other oxyanions such as chrome by adjusting the oxidation-reduction potential of the stabilized waste matrix. Accordingly, the inventors of the present invention recently discovered that polysulfide reagents are effective in stabilizing oxyanions such as chrome based upon adjustment of the oxidation-reduction potential of the reaction matrix.

During the course of the present invention the inventor determined that in many applications such as waste water treatment, residue stabilization and air emissions abatement, etc., it is not important whether the polysulfide reagent used is calcium polysulfide, sodium polysulfide, or some other form of polysulfide such as potassium polysulfide. Rather, in such applications, it is more important that the polysulfide reagent used is mainly polysulfide, and that it is relatively concentrated. From an economical standpoint, it is desirable that the polysulfide reagent is easy to produce in large quantities, and that it can be produced using a variety of inexpensive raw materials or byproduct wastes. The polysulfide chemical reagents of the present invention meet these desired criteria.

In contrast to making calcium polysulfide alone or sodium polysulfide alone, the present invention is directed to a chemical reagent that comprises a mixture of calcium polysulfide and sodium polysulfide that is referred to herein as calcium-sodium polysulfide. The formulation of this reagent is based on the following generalized reaction:

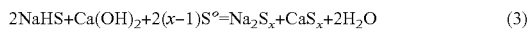

$$2NaHS + Ca(OH)_2 + 2(x-1)S^\circ = Na_2S_x + CaS_x + 2H_2O \qquad (3)$$

Calcium-sodium polysulfide reagent formulations that strictly adhere to this reaction result in a 1:1 molar ratio of sodium polysulfide and calcium polysulfide, both of which are highly soluble. The ratio can be easily varied, however, depending on the type of sulfide and alkaline materials most readily available. For example, virgin or waste caustic can be substituted or partially substituted for the lime, and calcium hydrosulfide can be substituted or partially substituted for the sodium hydrosulfide. If desired, the reagent can be prepared from virgin materials such as 25% NaSH or 45% NaSH, hydrated lime (Ca(OH)$_2$) or quick lime (CaO), and various types of elemental sulfur products. Alternatively, the calcium-sodium polysulfide reagent can be prepared using waste materials such as variable percent NaSH solutions from caustic scrubbing of hydrogen sulfide gases, waste lime sludges or solids from industrial production operations or air pollution control equipment, and sulfur filter cake such as typically generated from gas desulfurization processes using recirculated solutions of chelated iron. In some cases, the spent caustic solution from scrubbing of sulfide gases can have significant amounts of excess caustic in addition to the NaSH, thereby reducing the amount of other alkaline reagents needed to satisfy the general stoichiometry of Eq. 3. As a practical matter, the molar ratio of calcium polysulfide to sodium polysulfide in the calcium-sodium polysulfide reagent of the present invention can range from 9:1 to 1:9.

The calcium-sodium polysulfide reagents of the present invention can be made from various types of the raw materials that may be, in some instances, available as byproducts. Depending on the sources of raw materials the sodium or calcium can be replaced by other cations such as potassium or aluminum.

The polysulfide reagents of the present invention are made by combining: (1) a source of alkalinity from any of a variety of sources such as hydrated lime, quick lime, sodium hydroxide and potassium hydroxide; (2) elemental sulfur from any of a variety of sources such as virgin sulfinur prills or waste sulfur filter cake; and (3) a source of sulfide ions from any of a variety of sources such as sodium hydrosulfide, sodium sulfide, calcium hydrosulfide and hydrogen sulfide.

In general, these reactants are added in accordance with the stoichiometry shown in Eq. 3 or in amounts that will produces a desired ratio of the individual polysulfides.

FIG. 1 is a flowchart depicting one manner of combining reagents to make a calcium-sodium polysulfide reagent according to one embodiment of the present invention. As shown in FIG. 1, the reactants can all be added to a single reactor 1. Typically a source of alkalinity 5 from any of a variety of sources such as hydrated lime, quick lime, sodium hydroxide and potassium hydroxide and a source of elemental sulfur 4 from any of a variety of sources such as virgin sulfur prills or waste sulfur filter cake are added into the reactor 1 together with any supplemental water 6 used to dissolve the reactants (which can be added in aqueous forms). The reactor 1 can then optionally be heated, for example, by steam injection or any other suitable heating means. Thereafter the source of sulfide ions 7 from any of a variety of sources such as sodium hydrosulfide, sodium sulfide, calcium hydrosulfide and hydrogen sulfide can be added to the reactor 1. Depending on the sources of the reactants, heating of the reactor may not be required as the reaction will take place at room temperature. After the reaction is complete the resulting reaction products can be subject to a separation process 2 in which solids are removed from the calcium-sodium polysulfide reagent product. Any suitable solids separation process or equipment can be utilized.

Figure 2:
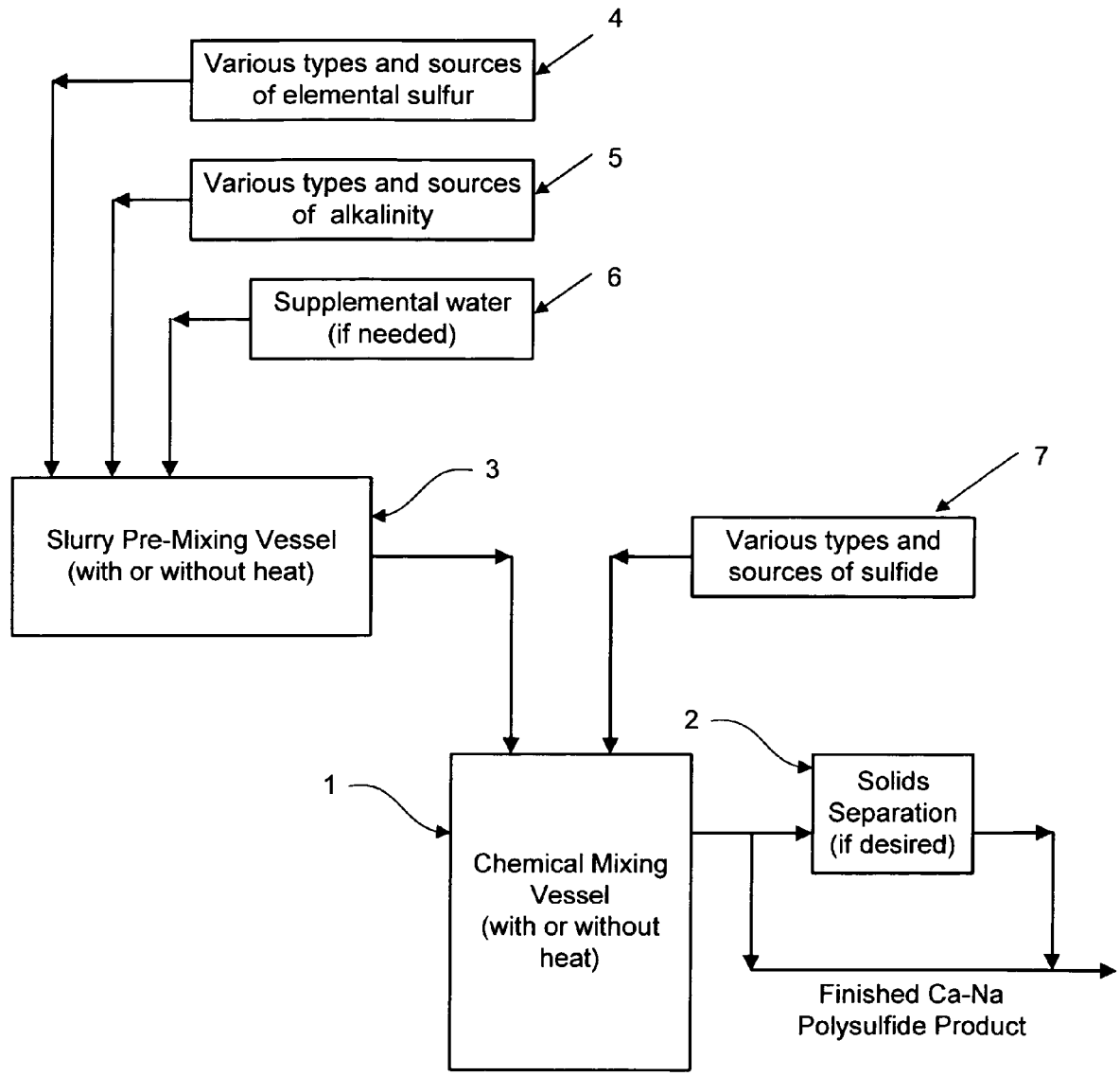
FIG. 2 is a flowchart depicting another manner of combining reagents to make a calcium-sodium polysulfide reagent according to another embodiment of the present invention.

FIG. 2 is a flowchart depicting another manner of combining reagents to make a calcium-sodium polysulfide reagent according to another embodiment of the present invention. As shown in FIG. 2, the source of alkalinity 5 and source of elemental sulfur 4 can be pre-mixed in an intermediate vessel 3 to provide a slurry that is thereafter transferred to a reactor 1 into which the sulfide source 7 is added. As in the case of the reaction flowchart of FIG. 1, the reactor 1 can then optionally be heated, for example by steam injection or any other suitable heating means before or after the source of sulfide ions is added to the reactor 1. Also, depending on the sources of the reactants, heating of the reactor 1 may not be required as the reaction will take place at room temperature. In addition, as in the case of the reaction flowchart of FIG. 1, after the reaction is complete, the resulting reaction products can be subject to a separation process 2 in which solids are removed from the calcium-sodium polysulfide reagent product. Any suitable solids separation process or equipment can be utilized. It is noted that the source of alkalinity 5 and source of elemental sulfur 4 can be pre-mixed in the reactor 1 rather than in a separate intermediate vessel.

The reaction schemes of both flowcharts in FIGS. 1 and 2 are amenable to batchwise, semi-batchwise or continuous production methods. Depending on the end use of the polysulfide reagent, removal of suspended solids may be performed, if needed, using any of a variety of processes, techniques and equipment such as gravity settling or filtration. In general, the reactions can be performed at room temperature but operation at about 125° F. to 150° F. accelerates reaction rate considerably.

The ability to premix the source of alkalinity and elemental sulfur with water to form a pumpable slurry, before transferring the premixed slurry into a reactor (where the sulfide reagent is added) allows the method to be used easily with waste sources of lime sludges and sulfur filter cakes that would be difficult to transfer into a closed reactor. Because no reaction takes place at room temperature when the source of alkalinity (waste lime) and elemental sulfur (waste sulfur) are combined, these two reactants can be readily mixed with water in open-topped basins and then pumped to a reactor where the sulfide reagent is then added.

Features and characteristics of the present invention will be exemplified by the following examples which are provided as non-limiting examples only. In the examples and throughout percentages are by weight unless otherwise indicated or determined by context.

EXAMPLE 1

In this example, a calcium-sodium polysulfide reagent was produced by combining the raw materials to a single mixing tank or reactor in the manner illustrated in FIG. 1. More specifically, a full-scale test was performed to verify that the method was simple and rapid. The demonstration produced about 3,500 gallons of calcium-sodium polysulfide reagent having a specific gravity of 1.31 and a total sulfur content of about 27%. The production method involved adding about 1,150 gallons of water (including some steam condensate) to an enclosed reactor with a mixing device and then adding 3,000 lbs of calcium hydroxide. 18,160 lbs of 25% NaSH solution was also added to the reactor. Live steam was briefly injected into the reactor to raise the temperature to 150° F. Next, approximately 7,840 lbs of elemental sulfur prills were added to the reactor and within less than an hour of mixing, the reaction was complete. The resultant product was deep red in color and had a specific gravity of 1.31 and a total sulfur content of 27%.

EXAMPLE 2

In this example, the calcium-sodium polysulfide reagent produced in Example 1 was tested for its ability to stabilize chromite ore processing residue (COPR) containing high levels of chrome. The applicability of the calcium-sodium polysulfide reagent to stabilize chrome residues was verified by applying various doses of the calcium-sodium polysulfide reagent to three different samples of chromite ore processing residue (COPR). The three samples used in this experiment had the following total chrome contents: COPR-1=1.8% Cr, COPR-3=2.4% Cr and COPR-4 of 1.3%. In accordance with Environmental Protection Agency (EPA) requirements for this type of waste material, the concentration of chrome in the leachate from the TCLP (toxicity characteristic leachate procedure) test protocol must be less than 0.60 mg/L after stabilization. The untreated TCLP leachate chrome concentrations for the three samples ranged from 40 mg/L to 100 mg/L. The results of the tests which included treating the COPR samples with different dosages (based upon percent by volume of the calcium-sodium polysulfide reagent) are summarized in Table I below.

TABLE I

| Liquid Reagent Dose (% by weight) | TCLP Cr for COPR-1 (mg/L) | TCLP Cr for COPR-3 (mg/L) | TCLP Cr for COPR-4 (mg/L) |
| --- | --- | --- | --- |
| 5.0% | 1.85 | 7.56 | 10.72 |
| 7.5% | 0.28 | 0.05 | 0.16 |
| 10.0% | 0.01 | 0.15 | <0.01 |
| 12.5% | <0.01 | 0.02 | <0.01 |
| 15.0% | <0.01 | 0.02 | <0.01 |
| 20.0% | <0.01 | <0.01 | <0.01 |

From the date in Table I, it can be seen that a 7.5% liquid dose or higher of the calcium-sodium polysulfide reagent stabilized the chrome in all three of the COPR samples to well below the 0.60 mg/L TCLP criterion.

EXAMPLE 3

In this example, a calcium-sodium polysulfide reagent was produced by combining the raw materials to a single mixing tank or reactor in the manner illustrated in FIG. 2. More specifically, a bench-scale test was conducted in which 74.5 grams of a sulfur filter cake (containing about 75% sulfur) was placed into 36 mL of tap water and stirred. 43.2 grams of lime filter cake (about 50% solids) was then added to the mixture and the resulting mixture was mixed to form a pumpable slurry. The slurry was transferred into a beaker to which 54.6 mL of 45% NaSH was then added and then an additional 39 mL of tap water was added. Within a few minutes after stirring at room temperature the slurry had completely reacted producing a deep-red calcium-sodium polysulfide alkaline reagent. The reagent had a specific gravity of 1.32 and a total sulfur content of 24.6%.

EXAMPLE 4

In this example, the calcium-sodium polysulfide reagent produced in Example 1 was tested for its ability to stabilize chromite ore processing residue (COPR) containing high levels of chrome. The particular sample of the COPR was the same as sample COPR-1 listed in Table I above. This sample had a total chrome content of 1.8% and an untreated TCLP leachate concentration of 40 mg/L. The results of the tests which included treating the COPR sample with different dosages (based upon percent by volume of the calcium-sodium polysulfide reagent) are summarized in Table II below

TABLE II

| Liquid Reagent Dose (% by weight) | TCLP Cr after 0 days cure time (mg/L) | TCLP Cr after 9 days cure time (mg/L) |
| --- | --- | --- |
| 6% | 1.48 | — |
| 8% | 0.28 | — |
| 10% | 0.04 | 0.03 |
| 15% | 0.05 | 0.06 |

From the data in Table II, it can be seen that an 8% liquid dose or higher of the calcium-sodium polysulfide reagent stabilized the chrome in the COPR sample. It is noted that for this series of tests, TCLP tests were performed immediately after the reagent doses were added, and TCLP tests were repeated after nine days of sample curing. The TCLP test results were essentially the same for zero days and nine days of cure time, thereby indicating immediate and effective stabilization.

EXAMPLE 5

In this example, a series of test formulations was conducted to demonstrate that the calcium-sodium polysulfide reagent of the present invention can be made relatively concentrated compared to current commercial grades of calcium polysulfide. One of the formulations used 15 grams lime, 40 grams sulfur and 80 mL of 25% sodium hydrosulfide (NaSH) with no water addition. The reaction was relatively fast and resulted in a calcium-sodium polysulfide solution with a specific gravity of 1.43 and a total sulfur content of about 37%. This is compared to commercial calcium polysulfide that has a specific gravity of about 1.27 and a total sulfur content of about 23%.

The results from the above examples demonstrated the effectiveness of the calcium-sodium polysulfide reagent and the ability to easily produce the reagent in a variety of ways using a variety of raw materials over a range of concentrations at ambient or warmer temperatures.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and in the claims that are attached hereto.

What is claimed is:

1. A calcium-sodium polysulfide chemical reagent that is stable at room temperature which comprises calcium polysulfide and sodium polysulfide in molar ratios ranging from about 9:1 to 1:9 and which calcium-sodium polysulfide chemical regeant has a specific density of at least about 1:31.

2. A calcium-sodium polysulfide chemical reagent according to claim 1, wherein the molar ratio of calcium polysulfide and sodium polysulfide is about 1:1.

3. A calcium sodium polysulfide chemical reagent according to claim 1, wherein the calcium-sodium polysulfide chemical reagent is a reaction product produced by reacting a source of alkalinity, a source of elemental sulfur, and a source of sulfide ions together.

4. A calcium-sodium polysulfide chemical reagent according to claim 1, wherein the source of alkalinity comprises hydrated lime.

5. A calcium-sodium polysulfide chemicul reagent according to claim 1, wherein the source of elemental sulfur comprises virgin sulfur.

6. A calcium-sodium polysulfide chemical reagent according to claim 1, wherein the sousce sulfide ions comprises sodium hydrosulfide.

7. A calcium-sodium polysulfide chemical reagent according to claim 1, wherein the source of alkalinity comprises quick lime.

8. A calcium-sodium polysulfide chemical reagent according to claim 1, wherein the source of alkalinity comprises sodium hydroxide.

9. A calcium-sodium polysulfide chemical reagent according to claim 1, wherein the source of alkalinity comprises potassium hydroxide.

10. A calcium-sodium polysulfide chemical reagent according to claim 1, wherein the source of elemental sulfur comprises waste sulfur.

11. A calcium-sodium polysulfide chemical reagent according to claim 1, wherein the sourec of sulfide ions comprises sodium sulfide.

12. A calcium-sodium polysulfide chemical reagent according to claim 1, wherein the source of sulfide ions comprises calcium hydrosulfide.

13. A calcium-sodium polysulfide chemical reagent according so claim 1, wherein the source of sulfide ions comprises hydrogen sulfide.

14. A calcium-sodium polysulfide chemical reagan according to claim 1, wherein the calcium-sodium polysulfide chemical reagent has a specific density of from 1.31 to 1.43.

* * * * *